United States Patent
Fraden

(10) Patent No.: US 8,834,019 B2
(45) Date of Patent: Sep. 16, 2014

(54) NON-CONTACT MEDICAL THERMOMETER WITH STRAY RADIATION SHIELDING

(75) Inventor: Jacob Fraden, San Diego, CA (US)

(73) Assignee: Helen of Troy Limited, St. Michael (BB)

(*) Notice: Subject to any disclaimer, the term of this patent is extended or adjusted under 35 U.S.C. 154(b) by 408 days.

(21) Appl. No.: 13/125,954

(22) PCT Filed: Oct. 23, 2009

(86) PCT No.: PCT/US2009/061842
§ 371 (c)(1),
(2), (4) Date: Jun. 2, 2011

(87) PCT Pub. No.: WO2010/048505
PCT Pub. Date: Apr. 29, 2010

(65) Prior Publication Data
US 2011/0228811 A1    Sep. 22, 2011

Related U.S. Application Data

(60) Provisional application No. 61/197,023, filed on Oct. 23, 2008.

(51) Int. Cl.
*G01J 5/06* (2006.01)
*G01J 5/08* (2006.01)
*G01J 5/00* (2006.01)

(52) U.S. Cl.
CPC ............... *G01J 5/061* (2013.01); *G01J 5/0896* (2013.01); *G01J 5/08* (2013.01); *G01J 5/0011* (2013.01); *G01J 5/089* (2013.01); *G01J 5/0809* (2013.01); *G01J 5/0806* (2013.01); *G01J 5/0834* (2013.01)
USPC ............... 374/121; 374/5; 374/208; 374/164; 374/131; 600/549; 600/474

(58) Field of Classification Search
USPC ......... 374/120, 121, 124, 129, 130–132, 163, 374/164, 208, 5; 600/474, 549, 473
See application file for complete search history.

(56) References Cited

U.S. PATENT DOCUMENTS 4,005,605 A * 2/1977 Michael .................... 374/129
4,290,182 A * 9/1981 Lawrence .................. 29/527.4

(Continued)

FOREIGN PATENT DOCUMENTS

CN    1341207 A    3/2002
JP    A-H04-028341    1/1992

(Continued)

OTHER PUBLICATIONS

Office Action from Chinese Patent Application No. 200980151773.7, mailed on May 10, 2013.

(Continued)

*Primary Examiner* — Gail Verbitsky
(74) *Attorney, Agent, or Firm* — Stroock & Stroock & Lavan LLP

(57) ABSTRACT

A non-contact infrared (IR) thermometer for measuring temperature from the surface of an object includes an IR radiation sensor attached to a heating element and a thermal shield having an interior surface positioned within the sensor's field of view that has a high emissivity. An electronic circuit controlling the heating element maintains the temperatures of the sensor and shield substantially close to an anticipated surface temperature of the object. The IR radiation sensor is further thermally coupled to a reference temperature sensor. An optical system positioned in front of the shield focuses thermal radiation from the object on the surface of the sensor, while the shield prevents stray radiation from reaching the sensor. Signals from the IR and reference sensors are used to calculate the object's surface temperature.

21 Claims, 4 Drawing Sheets

(56) References Cited

U.S. PATENT DOCUMENTS

| | | | |
|---|---|---|---|
| 4,722,612 A * | 2/1988 | Junkert et al. | 374/124 |
| 4,797,840 A | 1/1989 | Fraden | |
| 4,900,162 A * | 2/1990 | Beckman et al. | 374/132 |
| 5,018,872 A | 5/1991 | Suszynski et al. | |
| 5,169,234 A * | 12/1992 | Bohm | 374/128 |
| 5,169,235 A * | 12/1992 | Tominaga et al. | 374/129 |
| 5,293,877 A * | 3/1994 | O'Hara et al. | 600/549 |
| 5,325,863 A * | 7/1994 | Pompei | 600/549 |
| RE34,789 E * | 11/1994 | Fraden | 702/104 |
| 5,419,312 A * | 5/1995 | Arenberg et al. | 600/108 |
| 5,645,349 A * | 7/1997 | Fraden | 374/120 |
| 6,015,234 A * | 1/2000 | Gourrier et al. | 374/164 |
| 6,203,194 B1 * | 3/2001 | Beerwerth et al. | 374/133 |
| 6,556,852 B1 * | 4/2003 | Schulze et al. | 600/323 |
| 6,694,174 B2 * | 2/2004 | Kraus et al. | 600/474 |
| 7,014,358 B2 * | 3/2006 | Kraus et al. | 374/121 |
| 2002/0123690 A1 * | 9/2002 | Fraden | 600/473 |
| 2003/0060717 A1 * | 3/2003 | Kraus et al. | 600/474 |
| 2003/0222218 A1 | 12/2003 | Nozu | |
| 2010/0195697 A1 * | 8/2010 | Hollander et al. | 374/121 |

FOREIGN PATENT DOCUMENTS

| | | |
|---|---|---|
| JP | A-2001-054505 | 2/2001 |
| JP | A-2002-333370 | 11/2002 |

OTHER PUBLICATIONS

Mexican Patent Office Action issued in applicaton No. MX/A/2011/004364, dated Sep. 12, 2012.

* cited by examiner

NON-CONTACT MEDICAL THERMOMETER WITH STRAY RADIATION SHIELDING

This application is a national phase application under §371 of PCT/US2009/61842, filed Oct. 23, 2009, which claims priority to Provisional Patent Application No. 61/197,023, filed Oct. 23, 2008, the entire content of which is expressly incorporated herein by reference.

FIELD OF THE INVENTION

The present invention relates to devices for measuring temperature, and more specifically, to non-contact infrared thermometers for medical applications incorporating shielding to reduce the effects of stray radiation.

BACKGROUND OF THE INVENTION

A thermal radiation or infrared (IR) thermometer is a device capable of measuring temperature without physically contacting the object of measurement. Thus, such thermometers are often called "non-contact" or "remote" thermometers. In an IR thermometer, the temperature of an object is taken by detecting an intensity of the IR radiation which is naturally emanated from the object's surface. For objects between 0 and 100° C., this requires the use of IR sensors for detecting radiation having wavelengths from approximately 3 to 40 micrometers. Typically, IR radiation in this range is referred to as thermal radiation.

One example of an IR thermometer is an "instant ear" medical thermometer, which is capable of making non-contact temperature measurements of the tympanic membrane and surrounding tissues of the ear canal of a human or animal. Instant ear thermometers are exemplified by U.S. Pat. No. 4,797,840 to Fraden ("the '840 Patent"), which is incorporated by reference herein in its entirety. Other examples include medical thermometers for measuring surface skin temperatures (for example, a skin surface temperature of the forehead) as exemplified by U.S. Pat. No. 6,789,936 to Kraus et al., which is incorporated by reference herein in its entirety.

In order to measure the surface temperature of an object by its IR radiation emissions, the IR radiation is detected and converted into electrical signal suitable for processing by conventional electronic circuits. The task of detecting the IR radiation is accomplished by an IR sensor or detector.

Conventional thermal IR sensors typically include a housing with an infrared transparent window and at least one sensing element which is responsive to a thermal radiation energy flux $\Phi$ emanating from the object's surface to pass through the IR window of the IR sensor. The IR sensor functions to generate an electric signal which is representative of the net IR flux $\Phi$ existing between the sensing element and the object of measurement. The electrical signal can be related to the object's temperature by appropriate data processing as is for example further described below.

Thermal flux $\Phi$ is a function of two temperatures: a sensing element surface temperature $T_s$ and a surface temperature of the object $T_b$ (measured in degrees Kelvin). Theoretically, thermal radiation is known to be governed by Planck's law. However, for a broad optical spectral range, which may be determined by an optical system of the IR thermometer, the relationship between the two temperatures $T_s$, $T_b$ and the flux $\Phi$ may be approximated by a fourth-order parabola. In physics, this approximation is known as the Stefan-Boltzmann law:

$$\Phi = \kappa \epsilon_b \epsilon_s \sigma (T_b^4 - T_s^4) \tag{1}$$

where $\epsilon_b$ and $\epsilon_s$ are the surface emissivities of the object and sensing element, respectively, $\sigma$ is the Stefan-Boltzmann constant, and k is an optical constant which may be determined by measurement during calibration of the IR thermometer.

For a relatively small difference between the true object's temperature $T_b$ and sensor's temperature $T_s$ Eq. (1) can be simplified as:

$$\Phi \approx 4\kappa \epsilon_b \epsilon_s \sigma T_s^3 (T_b - T_s) \tag{2}$$

An ultimate purpose of an IR thermometer is to determine the surface temperature of the object ($T_b$), which may be calculated as $T_{bc}$ from inverted Eq. 2:

$$T_{bc} = T_s + \frac{\Phi}{4\kappa \varepsilon_b \varepsilon_s \sigma T_s^3} \tag{3}$$

Ideally, the computed temperature $T_{bc}$ should be equal to the true temperature $T_b$. Practically, these temperatures may differ as the result of error. It can seen from Equation (3) that, in order to calculate temperature $T_{bc}$, two values need to be determined: the magnitude of the IR flux $\Phi$ and the IR sensing element's surface temperature $T_s$. The accuracy of the temperature computation depends on the measurement accuracy for all variables at the right side of Eq. (3). The first summand $T_s$ can be measured quite accurately by a number of techniques known in the art, for example, by employing a thermistor or RTD temperature sensor. The second summand can be more problematic, especially due to a generally unknown and unpredictable value of the object's emissivity $\epsilon_b$. For example, in medical thermometry, the emissivity $\epsilon_b$ is a skin emissivity that is defined by the skin properties and shape. The skin emissivity may, for example, range from 0.93 to 0.99. To determine how emissivity affects accuracy, a partial derivative of Eq. (2) may be calculated as:

$$\frac{\partial \Phi}{\partial \varepsilon_b} = 4\kappa \varepsilon_s \sigma T_s^3 (T_b - T_s) \tag{4}$$

The partial derivative represents the measurement error due to an unknown emissivity $\epsilon_b$ of an object. Eq. (4) shows that the error essentially approaches zero when temperature Ts of the sensor approaches temperature $T_b$; of the object, that is when $T_b \approx T_s$. Thus, to minimize errors, it is desirable to keep the temperature $T_s$ of the IR sensor as close as is practical to the object's temperature $T_b$. For an instant ear thermometer, for example, U.S. Pat. No. 5,645,349 to Fraden teaches a heated sensing element for bringing the temperatures $T_s$, $T_b$ into proximity U.S. Pat. No. 7,014,358 issued to Kraus et al. alternatively teaches a heating element for warming the IR sensor housing. U.S. Pat. No. 5,645,349 and U.S. Pat. No. 7,014,358 are each incorporated by reference in its entirety herein.

When temperature is measured from a surface, it is important to direct the associated IR radiation flux $\Phi$ to the IR sensor only from the measured surface, and not from any stray objects that may appear in the field of view of the optical system. IR radiation from stray objects alters the measured flux, and thereby contributes to error.

One way to minimize the chance of picking up flux from stray objects is to narrow the optical field of view of the IR thermometer. One method of using IR lenses to narrow the optical field of view is exemplified by U.S. Pat. No. 5,172,978 to Nomura et al. (radiant thermometer including a lens barrel mounting a condensing lens at one end and an IR detector at the other end) and U.S. Pat. No. 5,655,838 to Ridley et al. (radiation thermometer with multi-element focusing lens, eye piece, beam splitter and IR detector), each of which is incorporated by reference in its entirety herein.

Another method for minimizing the chance of picking up flux from stray objects employs curved mirrors to narrow the field of view. This approach is exemplified by U.S. Pat. No. 4,494,881 to Everest, which is incorporated by reference in its entirety herein.

These methods successfully solve the problem of eliminating stray IR signals from surrounding objects, but remain ineffective in further preventing stray radiation from interior components of the IR thermometer that surround the IR sensor. This source of stray radiation is unaffected by efforts to limit the optical field of view. It would be of significant benefit to develop an IR thermometer having an IR sensor that is unaffected by stray radiation from interior components of the IR thermometer that surround the IR sensor.

SUMMARY OF THE INVENTION

A non-contact infrared (IR) thermometer according to the present invention includes an IR radiation sensor thermally coupled to a heating element and a thermal shield having an interior surface positioned within the sensor's field of view, such interior surface has a high emissivity. An electronic circuit controlling the heating element maintains the temperatures of the sensor and shield substantially close to an anticipated surface temperature of the object. The IR radiation sensor is further thermally coupled to a reference temperature sensor. An optical system positioned in front of the shield focuses thermal radiation from the object on the surface of the sensor, while the shield prevents stray radiation from reaching the sensor from the thermometer parts. Signals from the IR and reference temperature sensors are used to calculate the object's surface temperature.

The thermal shield is configured to reduce stray thermal generation emanating from the interior surface positioned within the thermal radiation sensor's field of view, in part by maintaining the temperatures of the thermal radiation sensor and the thermal shield to be substantially equal. In addition, the interior surface may be treated to be non-reflective of IR radiation (for example, by coating the surface with an organic paint having an emissivity of 0.9 or higher).

The optical system may preferably comprise a lens. Alternatively, the optical system may preferably comprise a curved mirror.

The thermometer may also comprise a shutter that is movable to shield the interior surface of the thermal shield and thermal radiation sensor from thermal radiation emanating externally from the shield (for example, thermal radiation emanating from the object). When shielded, a baseline output of the thermal radiation sensor can be obtained for calibrating the sensor. In the thermometer comprising the curved mirror, the curved mirror is preferably rotable configured as the movable shutter.

The thermometer is also preferably provided with an illuminator for illuminating at least a portion of the field of view of the thermal radiation sensor on the surface of the object. In the thermometer comprising the curved mirror, the illuminator may preferably project a light beam that off an ancillary surface of the curved mirror toward the surface of the object.

BRIEF DESCRIPTION OF THE DRAWINGS

The foregoing and other features of the present invention will be more readily apparent from the following detailed description and drawings of illustrative embodiments of the invention in which.

Like reference numerals are used in the drawing figures to connote like components of the thermometer.

DETAILED DESCRIPTION OF THE PREFERRED EMBODIMENTS

An IR thermometer is disclosed that includes a thermal shield having a surface that is covered by the sensor's field of view. The surface preferably includes a high-emissivity coating that minimizes stray radiation from the shield. For the purpose of illustrating principles of the present invention, several non-limiting embodiments of the IR thermometer and thermal shield are described below. Accordingly, the invention is to be limited only by the scope of the claims and their equivalents.

Figure 1:
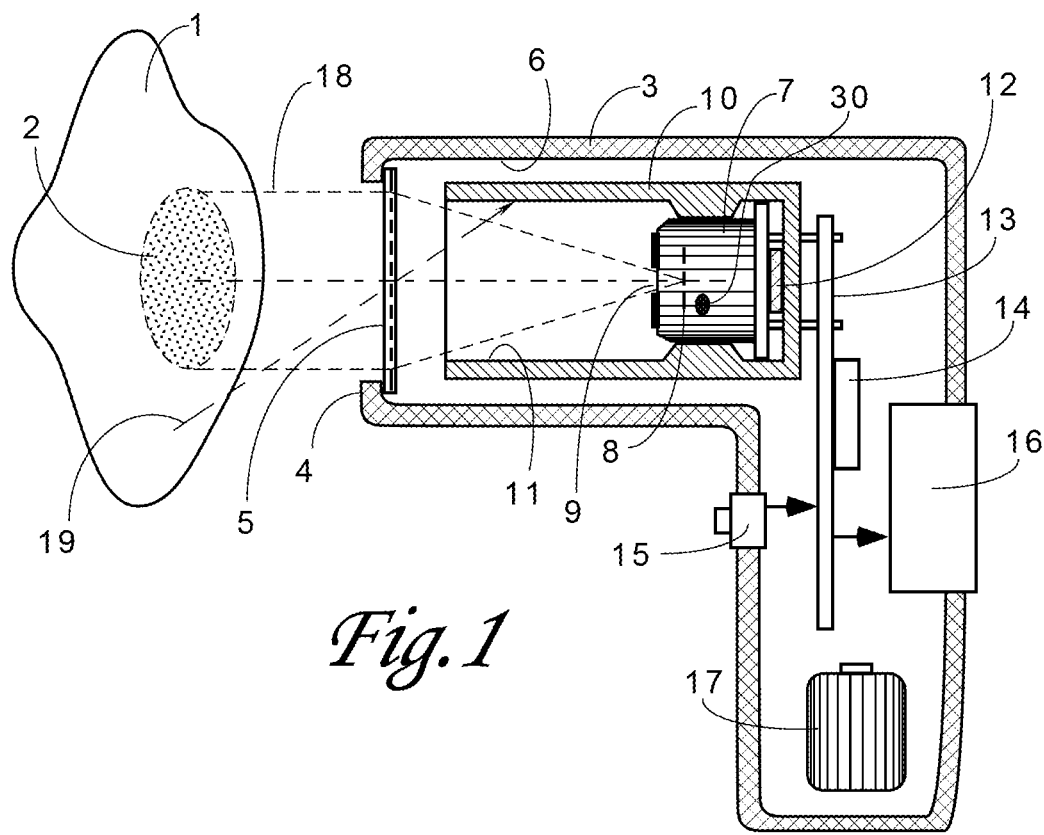
FIG. 1 provides a cross-sectional view of an IR thermometer according to an embodiment of the present invention.

FIG. 1 shows a schematic, cross-sectional View of a remote thermometer. The thermometer of FIG. 1 includes a housing 3 that contains an infrared sensor 7, several optical components which are described further herein, a circuit board 13 with an electronic circuit 14, a power supply 17, a control button 15, and a display 16. The optical components include an aperture 9 that admits IR radiation into the sensor 7, a lens 5 and a thermal shield 10. The sensor 7 may also preferably contain an optical filter (not illustrated) in proximity to aperture 9. The sensor 7 is positioned inside and thermally coupled to a thermal shield 10 that during operation is in thermal equilibrium with the sensor 7.

As further shown in FIG. 1, the sensor 7 incorporates an IR sensing element 8 that is thermally coupled to a reference temperature sensor 30. A heating element 12 is coupled to the thermal shield 10 and is also thermally coupled to the sensor 7 and all its internal components, including the sensing element 8 and reference sensor 30. In this manner, these components can be brought into a thermal equilibrium with one another. The focusing lens 5 is provided in proximity to an IR radiation-receiving opening 4 of the housing 3, and is configured to converge nearly parallel IR rays 18 from a field of view 2 of an object 1 to be directed to the aperture 9 such that the IR rays 18 are focused on and absorbed by the sensing element 8.

The button 15 of FIG. 1 is actuated to initiate a temperature measurement of the object 1 by activating the circuit 14 to process data received from the sensing element 8 and the reference sensor 7. The circuit 14 also operates to control the amount of energy supplied to the heating element 12 according to a predetermined algorithm [for example, a Proportional-Integral Derivative (PID) corrective algorithm], and to provide an output to the display for indicating a measured temperature according to the processed data. The circuit 14 includes an amplifier, multiplexer, microcontroller with a display driver and output transistor that controls electric currents to the heating element 12. The circuit 14 is of design that is well known in art as exemplified by "840 Patent".

Inner surface 11 of the thermal shield 10 is configured to be in the field of view of the sensing element 8. Thermal shield 10 is preferably fabricated using a metal with good thermal conductivity (for example, copper or aluminum), and preferably includes an inner surface 11 coated with a heat absorbing (non-reflecting) coating 19, such as organic paint having an emissivity greater than 0.9, for example KRYLON. The outer surface of the shield 10 may be covered by a thermal insulating layer (not shown), and/or made reflective in the IR spectral range. The insulating layer maybe a urethane foam and the reflective property can be achieved by polishing the outer surface of the shield 10. The shield 10 is sized to substantially prevent any stray radiation from an interior surface 6 of the housing 3 from reaching the aperture 9. As a result, only the IR rays 18 passing through the focusing optical device (lens 5) and IR rays emanating from the inner surface 11 of the shield 10 are able to reach the sensing element 8.

A preferred embodiment of the present invention operates as follows. IR rays 18 are naturally emanated from the surface of the object 1 (for example, a human skin surface). The IR rays 18 are received by the focusing optical device (lens 5). The sensing element 8 is positioned at or near the focal point of the lens 5. As a result, a substantial portion of the thermal IR energy radiated from the field of view 2 toward the lens 5 is focused on the sensing element 8, which converts the thermal IR flux into an electrical signal. In order to calculate a surface temperature of the surface in the field of view 2 (for example, using Equation (3) or an approximation or variation thereof), a reference temperature (that of the sensing element 8) also must be measured. This may be accomplished by the reference sensor 30 that is thermally coupled to the IR sensing element 8. Such arrangements coupling a sensing element with a reference sensor are well known in art.

In addition, according to the present invention, the thermal shield 10 is provided and configured to surround the IR rays 18 radiated from the field of view 2 in such a way as to substantially prevent any stray rays from reaching the sensing element 8.

To further improve measurement accuracy, the temperature of the sensing element 8 is preferably controlled to be substantially equal to an anticipated surface temperature of object 1 within the field of view 2. For example, if object 1 is a human forehead, its surface temperature may range from 31 to 38° C. for the group including healthy and febrile patients. In this case, the temperature for the heating element 12 is preferably set near 34-35° C. To reach and maintain this temperature, the reference sensor 30 monitors the temperature of the sensing element 8 and provides feedback to the circuit 14 which, in turn, provides energy to the heating element 12. In effect, this arrangement operates thermostatically. In addition, the thermal shield 10 is preferably maintained at or near the same controlled temperature, which may be significantly different from temperatures of the housing 3 and the inside surface 6.

By maintaining the temperature of the shield's 10 inner surface 11 close to that of the sensing element 8, in accordance with Equation (2), little or no IR radiation is emanated from the surface 11 toward the sensing element 8. As a result, the thermal shield 10 effectively becomes thermally "invisible" to the sensing element 8.

The lens 5 may be fabricated of any suitable IR transmissive material, including for example germanium, silicon, and zinc selenide. Surfaces of the lens 5 may preferably be coated with an IR antireflective coatings for the spectral range from 4 to 15 micrometers of wavelength. Such coatings are well known in art and generally comprise thin multiple layers (5-40 nm) of metal nitrides, such a titanium nitride, niobium nitride and others deposited in vacuum on both sides of the lens. In low cost applications, for example, the lens 5 may be a Fresnel lens molded of a high-density polyethylene (HDPE) sheet having thickness in the range from 0.2 to 0.6 mm.

Figure 9:
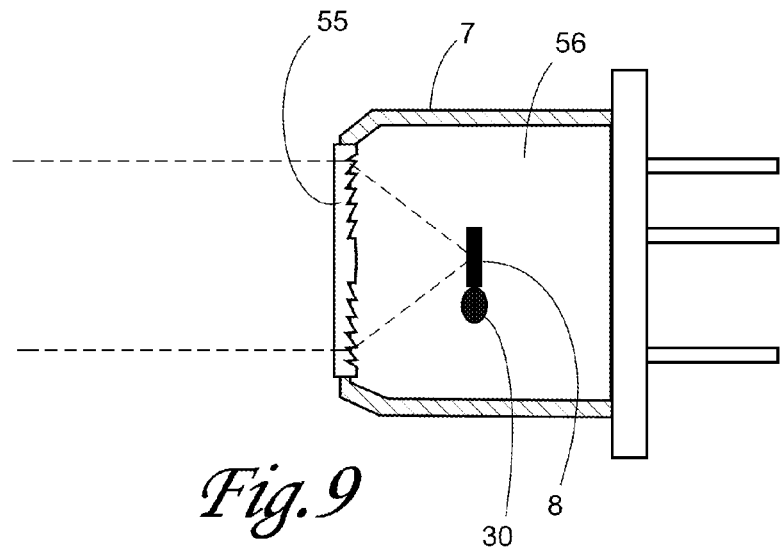
FIG. 9 provides a cross-sectional view of a sensor for an IR thermometer according to the present invention having a focusing lens.

Alternatively to the configuration depicted in FIG. 1, the lens 5 may be installed inside the shield 10, or built into the housing of the IR sensor 7 as illustrated in FIG. 9. In FIG. 9, an inner space 56 of sensor 7 contains at least one IR sensing element 8 that is thermally coupled to a reference temperature sensor 30. The sensing element 8 is positioned at or near the focal point of lens 55 (illustrated as a Fresnel lens) that is incorporated into the front end of the sensor 7.

Figure 2:
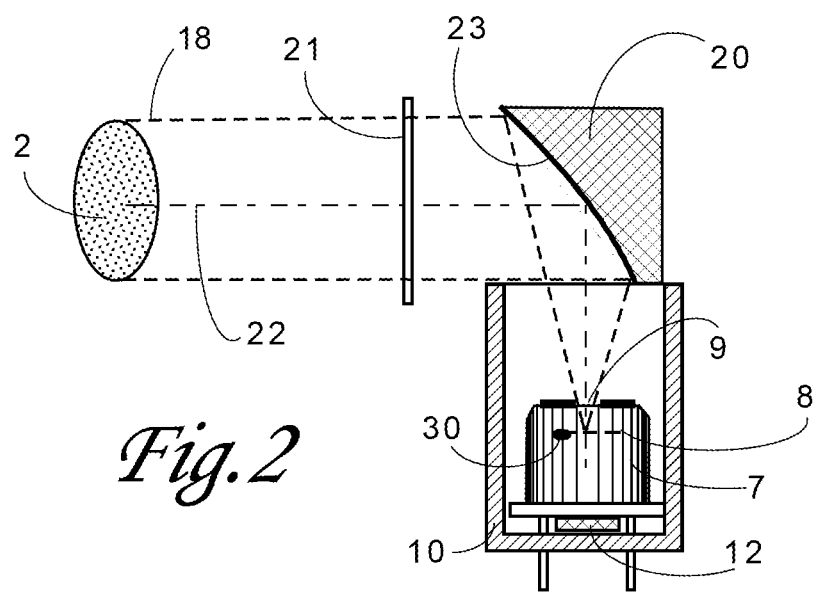
FIG. 2 depicts an optical part of an IR thermometer according to another embodiment of the present invention.

In another embodiment of the present invention, the focusing optical device is provided in the form of a focusing mirror 20 as shown in FIG. 2. The mirror 20 as illustrated in FIG. 2 has a parabolic reflective surface 23 positioned with reference to an optical axis 22 so that a reflection of the IR rays 18 is redirected toward aperture 9. The sensing element 8 is positioned at or near a focal point of the mirror 20. A protective window 21 may preferably be employed in front of mirror 20 in the path of the IR rays 18. The window may be fabricated of a suitable material having relative high transparency in the IR spectral range (for example, such as HDPE, silicon, and the like). For a better selectivity, the mirror surface 23 may be coated with gold, aluminum or another suitable IR reflective metal. As in FIG. I, the thermal shield 10 is configured to be in the field of view of the sensing element 8 and is sized to substantially prevent any stray radiation from the interior the housing 3 from reaching the aperture 9.

Figure 3:
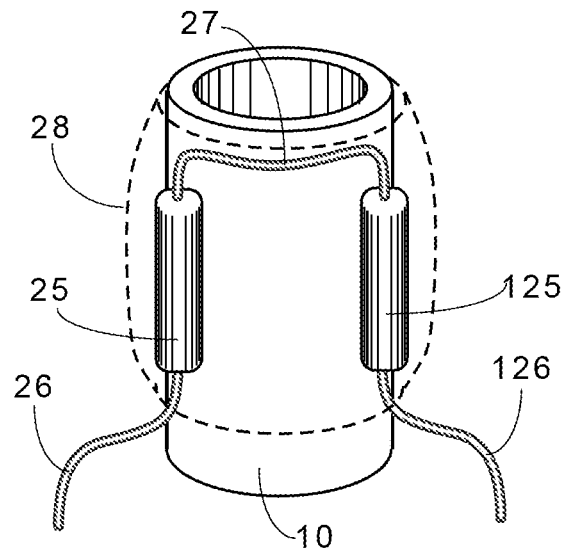
FIG. 3 provides a schematic view of a sensor shield according to another embodiment of the present invention.

In FIG. 2, the heating element 12 is sandwiched between the sensor 7 and thermal shield 10. Such a heating element 12 may be fabricated in form of a flexible film made of polyimide with imbedded copper conductors. Alternatively, the heating element 12 may be at another position on this assembly as long as good thermal coupling of the assembly is maintained. For example, in FIG. 3, the heating element 12 includes two resistors 25, 125 which are thermally coupled to the thermal shield 10 and clamped to its outside walls, for example, by a shrink tubing 28 shown by a broken line for clarity. The resistors are interconnected by wire 27 and connected to the circuit board 13 by terminals 26 and 126. The resistors 25, 125 may be provided in alternative numbers (for example, one resistor only or four resistors circumferentially spaced around the thermal shield 10), and may be provided in a variety of forms including discrete resistors, film resistors, and printed resistors.

Figure 4:
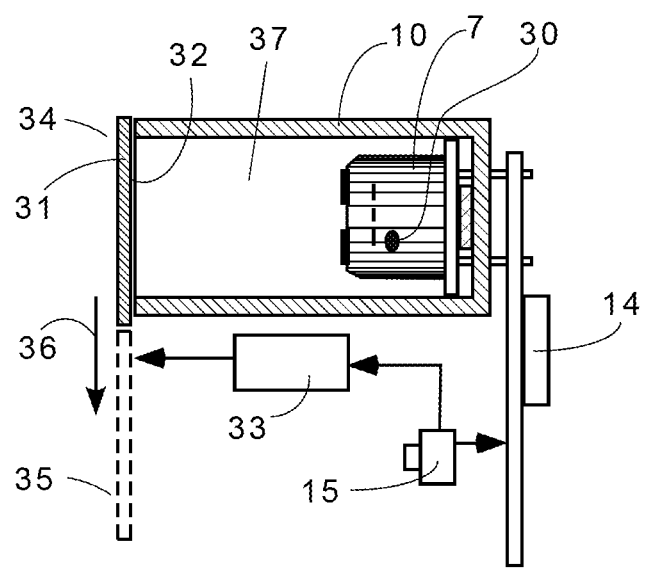
FIG. 4 depicts a shutter arrangement in combination with an optical part of a remote thermometer according to an embodiment of the present invention.

For accurate temperature measurement, it may be desirable to establish a thermal baseline of the IR sensing element 8 response. The baseline is to be established under conditions where no IR flux from any external object reaches the sensing element 8. This can be accomplished by several methods. One preferred method includes the use of shutter 31 as shown in FIG. 4.

Figure 5:
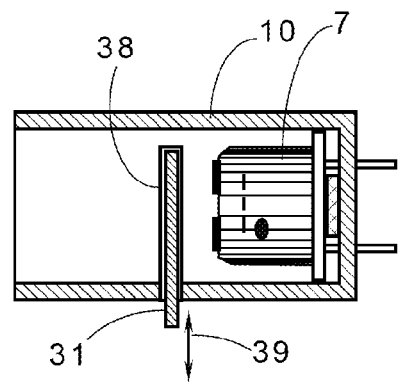
FIG. 5 depicts another shutter arrangement according to an embodiment of the present invention.

To establish a baseline, the shutter 31 is set in a first position 34 which substantially blocks external IR rays from entering inner space 37 of thermal shield 10 to reach sensor 7. A surface 32 that faces an interior space 37 is coated with aluminum or gold to be highly reflective in the IR spectral range (that is, having a coefficient of reflectivity be no less than 0.9). After a baseline output of the sensing element 8 is established from temperature measurements made for this configuration, and when a temperature measurement of the object 1 is to be made, shutter 31 is moved in a direction 36 to a second position 35, out of the path of the IR rays. This action opens the space 37 to allow external IR radiation from the field of view 2 of the object to reach the sensor 7. After the temperature measurement of the object 1 is complete, shutter 31 returns to the closed position that is first position 34. The shutter 31 is preferably moved by a shutter mechanism 33 that is controlled by operation of the button 15 or the circuit 14. Such shutter mechanisms are well known in the art (see, for example, the '840 Patent). As an alternative to the configuration of FIG. 4, the shutter 31 may be positioned inside a slot 38 that, for example, is cut into a side wall of the shield 10 as shown in FIG. 5 to move along the direction 39.

Figure 6:
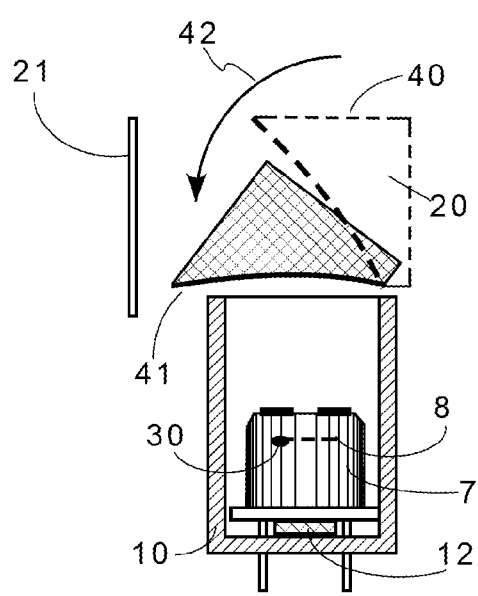
FIG. 6 depicts a tilted mirror included in an optical part of an IR thermometer according to an embodiment of the present invention.

An alternative embodiment of the present invention, a baseline of the sensing element 8 may be established by using a rotatable tilted mirror 20 as shown in FIG. 6. In a first position 41, the mirror 20 is rotated along the direction 42 to optically close an inner space of the thermal shield 10. In this position, substantially no IR rays can reach the sensor 7. When a temperature measurement of the object 1 is performed, the mirror 20 rotates to a second position 40 (shown by a broken line for clarity) that allows IR rays to arrive from a window 21 and reach the IR sensing element 8. After the measurement, the mirror 20 returns to the first position 41. A mechanism for affecting the mirror rotation can be of a conventional design controlled by the electronic circuit 14, and is not further described herein.

Figure 7:
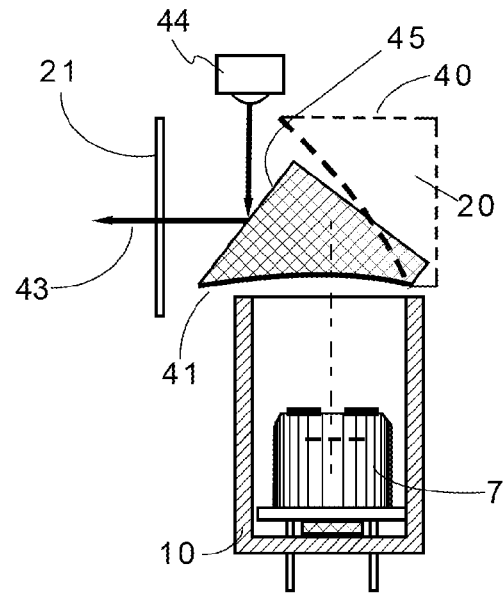
FIG. 7 shows an illuminator operable with the tilted mirror of FIG. 6.

For a better identification of the field of view 2, it is preferable to illuminate the area from which temperature is to be measured. One way to accomplish this is shown in FIG. 7. A light source 44 (for example, a lamp, LED or laser diode) is positioned outside of the shield 10 adjacent to the mirror 20. A surface 45 of the minor 20 is positioned at an angle for reflecting light from the light source 44 to form a light bean 43 toward the field of view 2 through the window 21 when the mirror 20 is in the first position 41. The light beam 43 is aligned to illuminate the same portion of the filed of view 2 from which temperature will be measured when the mirror rotates to the second position 40. At that moment, the light source 44 preferably extinguishes the illumination.

Figure 8:
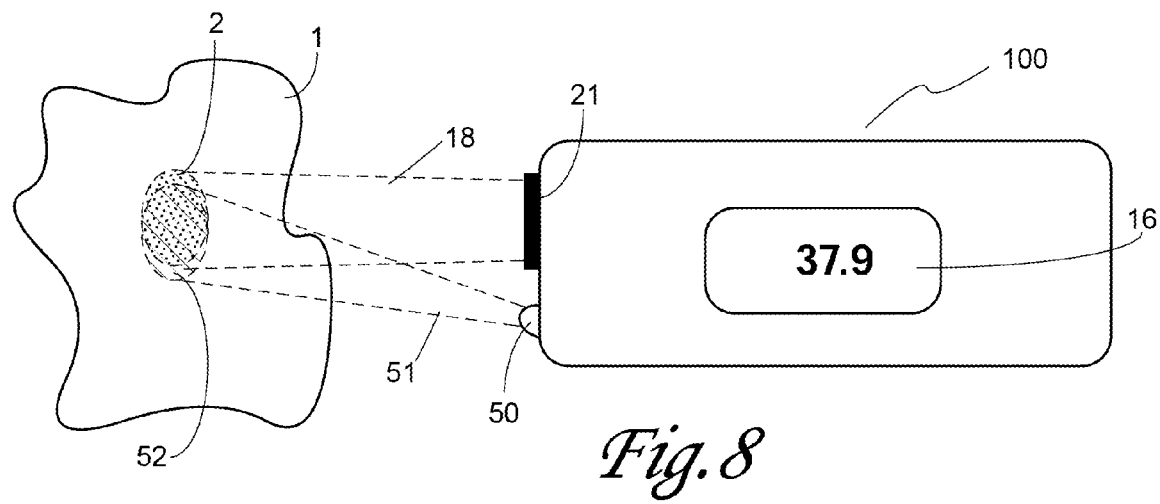
FIG. 8 depicts a schematic view of an IR thermometer according to the present invention an illuminator provided on an external surface of a thermometer housing.

An alternative method of illuminating the field of view 2 is depicted in FIG. 8. Here, an illuminator 50 (for example, a narrow beam LED) is positioned externally on the housing 3 in proximity to the IR window 21. A beam 51 generated by the illuminator 50 is directed toward the field of view 2, and nearly overlaps with it to form an illuminated spot 52.

After a value for the surface temperature for the field of view 2 is computed, it is preferably displayed directly on the display 16 and/or used as an input for further data processing. An example of further data processing in medical thermometry is computing an inner (core) temperature of a patient from the skin temperature by means of a conventional algorithm known in art, which may then be displayed on the display 16.

With reference to FIG. 8, an exemplary temperature measurement process according to the present invention, for example, contains the following steps:

1. Elevate the temperature of the heating element 12 to maintain a temperature of the infrared sensor 7 substantially at a constant level of about 34 OC. The thermal shield 10 assures that thermal radiation is received only from the focusing device.

2. Turn on the light source 44, directing the light beam 51 toward the field of view 2 of the object 1

3. Operate the button 15 to initiate the measurement cycle.

4. Turn off the heating element 12 to prevent its interference with the thermal radiation measurement process.

5. Process signals provided by the sensing element 8 and reference sensor 30 in the circuit 14 to compute the surface temperature of the object 6. Provide the computed surface temperature at the display 16.

While the invention has been particularly shown and described with reference to a number of preferred embodiments thereof, it will be understood by those skilled in the art that various changes in form and details may be made therein without departing from the spirit and scope of the invention. Accordingly, the invention is to be limited only by the scope of the claims and their equivalents.

What is claimed is:

1. A thermal radiation thermometer for measuring a surface temperature of an object, the thermometer comprising:
    a thermal radiation sensor;
    an optical device configured for receiving thermal radiation emanated by the object and directing the thermal radiation to the thermal radiation sensor;
    a reference temperature sensor thermally coupled to the thermal radiation sensor;
    a thermal shield including an outer surface and an internal cavity configured for receiving the thermal radiation sensor, and thermally coupling the thermal radiation sensor to the thermal shield, such that the interior cavity of the thermal shield is within a field of view of the thermal radiation sensor;
    an electronic circuit electrically coupled to the thermal radiation sensor and to the reference temperature sensor, the electrical circuit being configured to process signals generated by the thermal radiation sensor and the reference temperature sensor to calculate the surface temperature of the object, and
    a housing configured for enclosing and fixedly positioning the thermal radiation sensor, the optical device and the thermal shield relative to one another,
    wherein the thermal shield is further configured within the housing to substantially shield the thermal radiation sensor from stray thermal radiation emanating from interior surfaces of the housing,
    a heating element thermally coupled to the thermal radiation sensor and to the thermal shield.

2. The thermal radiation thermometer of claim 1, further comprising:
    an electronic circuit electrically coupled to the heating element and to the reference temperature sensor, the electrical circuit being configured to process signals generated by the reference temperature sensor to control an amount of energy supplied to the heating element according to a predetermined algorithm.

3. The thermal radiation thermometer of claim 2, wherein the electronic circuit is configured to control the amount of energy applied such that a temperature of the thermal radiation sensor is substantially within a range of anticipated surface temperatures of the object.

4. The thermal radiation thermometer of claim 1, wherein the heating element is on an exterior surface of the thermal shield.

5. The thermal radiation thermometer of claim 1, wherein the thermal radiation sensor comprises:
    a housing;

an aperture in the housing configured for receiving the thermal radiation directed by the optical device; and an interior cavity including a thermal sensing element positioned to sense the thermal radiation received by the aperture, wherein the thermal sensing element is thermally coupled to the reference temperature sensor.

6. The thermal radiation thermometer of claim 5, wherein, the optical device comprises a lens positioned within the aperture in the housing of the thermal radiation sensor.

7. The thermal radiation thermometer of claim 6, wherein, the lens is a Fresnel lens.

8. The thermal radiation thermometer of claim 1, wherein the optical device is positioned within the field of view at a distance from the thermal radiation sensor that is substantially equal to a focal distance of the optical device.

9. The thermal radiation thermometer of claim 8, wherein the optical device comprises a lens.

10. The thermal radiation thermometer of claim 9, wherein the lens comprises high density polyethylene (HDPE).

11. The thermal radiation thermometer of claim 8, wherein the optical device comprises a mirror.

12. The thermal radiation thermometer of claim 8, wherein the mirror is rotatable between a closed position that closes the interior cavity of the thermal shield to the thermal radiation emanated by the object and an open position that opens the interior cavity of the thermal shield to the thermal radiation emanated by the object.

13. The thermal radiation thermometer of claim 11, wherein the mirror includes a parabolic reflective surface for directing the thermal radiation to the thermal radiation sensor when the curved mirror is in the open position.

14. The thermal radiation thermometer of claim 11, further comprising an illuminator for substantially illuminating at least a portion of the field of view on the surface of the object, the illuminator positioned adjacent to an infrared (IR) window, wherein the mirror includes an angled reflective surface for directing a light beam of the illuminator toward the surface of the object when the curved mirror is in the closed position.

15. The thermal radiation thermometer of claim 1, further comprising:

an illuminator for substantially illuminating at least a portion of the field of view on the surface of the object.

16. The thermal radiation thermometer of claim 1, further comprising:

a shutter having an inner surface movable within and outside of the field of view, and a shutter control device for moving the inner surface within and outside the field of view;

wherein the inner surface is positioned adjacent to the interior cavity when said shutter is within the field of view.

17. The thermal radiation thermometer of claim 16, wherein the shutter is movable between a closed position that closes the interior cavity of the thermal shield to the thermal radiation emanated by the object and an open position that opens the interior cavity of the thermal shield to the thermal radiation emanated by the object.

18. The thermal radiation thermometer of claim 16, wherein the inner surface of the shutter is substantially reflective within a spectral range of 4 to 15 μm.

19. The thermal radiation thermometer of claim 1, further comprising:

a thermal insulator positioned adjacent to the outer surface.

20. The thermal radiation thermometer of claim 1, wherein a surface of the inner cavity of the thermal shield is substantially non-reflective within a spectral range of 4 to 15 μm.

21. The thermal radiation thermometer of claim 1, further comprising:

a protective window fixed in the housing, the protective window configured for receiving the thermal radiation emanated by the object and transmitting the thermal radiation to the optical device.

* * * * *